United States Patent
Irie et al.

(10) Patent No.: US 9,043,137 B2
(45) Date of Patent: May 26, 2015

(54) MAP DISPLAY DEVICE AND NAVIGATION DEVICE

(75) Inventors: Hiroshi Irie, Tokyo (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 140 days.

(21) Appl. No.: 13/816,744

(22) PCT Filed: Dec. 20, 2010

(86) PCT No.: PCT/JP2010/007377
§ 371 (c)(1),
(2), (4) Date: Feb. 13, 2013

(87) PCT Pub. No.: WO2012/085960
PCT Pub. Date: Jun. 28, 2012

(65) Prior Publication Data
US 2013/0144522 A1      Jun. 6, 2013

(51) Int. Cl.
*G01C 21/36* (2006.01)
*G09B 29/00* (2006.01)
*G01C 21/00* (2006.01)
*G09B 29/10* (2006.01)

(52) U.S. Cl.
CPC ............ *G01C 21/00* (2013.01); *G01C 21/3667* (2013.01); *G01C 21/3697* (2013.01); *G09B 29/007* (2013.01); *G09B 29/106* (2013.01)

(58) Field of Classification Search
CPC .......... G01C 21/3667; G01C 21/3697; G09B 29/106; G09B 29/007; G04G 9/0076
USPC .................................... 368/14; 701/430, 454
See application file for complete search history.

(56) References Cited

U.S. PATENT DOCUMENTS

| 6,366,834 | B1 | 4/2002 | Hayes et al. |
| 7,904,238 | B2* | 3/2011 | Nesbitt ................... 701/420 |
| 8,194,505 | B2* | 6/2012 | Hirano .................... 368/14 |
| 2008/0208453 | A1* | 8/2008 | Fujimoto .................. 701/202 |
| 2010/0135124 | A1 | 6/2010 | Hirano |
| 2011/0246054 | A1 | 10/2011 | Toma |

FOREIGN PATENT DOCUMENTS

| JP | 63-95600 A | 4/1988 |
| JP | 2002-62383 A | 2/2002 |
| JP | 2005-121425 A | 5/2005 |
| JP | 4297513 B1 | 7/2009 |
| JP | 2010-127808 A | 6/2010 |
| JP | 2010-243181 A | 10/2010 |
| WO | WO 2007/043398 A1 | 4/2007 |
| WO | WO 2010/067458 A1 | 6/2010 |

* cited by examiner

*Primary Examiner* — John R Olszewski
*Assistant Examiner* — Todd Melton
(74) *Attorney, Agent, or Firm* — Birch, Stewart, Kolasch & Birch, LLP

(57) ABSTRACT

According to a map display device, from current location information acquired by a current location acquiring unit 6 and boundary coordinate information in time zone information acquired by a time zone information acquiring unit 22, it is determined whether or not a vehicle 9 is located within a set area which is provided in the range of a predetermined distance from a boundary of a time zone to which a current location of the vehicle 9 belongs, and if it is determined that the vehicle 9 is located within the set area, a display unit 3 displays distinctively the time zone to which the current location of the vehicle 9 belongs and a time zone which is adjacent to the corresponding time zone through the set area.

10 Claims, 12 Drawing Sheets

(a)

(b)

MAP DISPLAY DEVICE AND NAVIGATION DEVICE

TECHNICAL FIELD

The present invention relates to a map display device that is installed in a mobile unit such as a vehicle or carried by its occupant, and that performs a map display according to a standard time in a region where the corresponding mobile unit is to be moved, and a navigation device using the same.

BACKGROUND ART

Regional standard times of countries in the world are provided with time differences defined on the basis of Universal Time Coordinated (UTC). The standard times are basically provided for given regions that are mainly divided in longitudinal directions, and these regions each are called 'a time zone.'

In this regard, according to Patent Document 1, for example, in the case where a host vehicle comes and goes between time zones or travels a road crossing over a boundary between time zones, a time displayed is performed without giving a troublesome feeling as much as possible to a driver even if the time zone is changed, such that a display unit for indicating the time is changed in color or blinked.

PRIOR ART DOCUMENTS

Patent Documents

Patent Document 1: Japanese Patent Application Laid-open

SUMMARY OF THE INVENTION

Problems to be Solved by the Invention

However, in the conventional art to be represented by Patent Document 1, because the display portion is merely changed in color or made blinking when the time zone is changed, there is a problem such that it is difficult to visually grasp where the time zone is changed to another time zone in a map, so that a time thereof is corrected.

The present invention has been made to solve the aforementioned problem, and an object of the invention is to provide a map display device capable of performing a map display in which the change of a time zone is readily visible, and a navigation device utilizing the same.

Means for Solving the Problem

A map display device of the invention is the one installed in a mobile unit or carried and displaying a map on a display unit, and includes: a location information acquiring unit for acquiring current location information of the mobile unit; a storage unit for storing time zone information including boundary information representing a region belonging to a time zone, and time difference information having a time difference between a standard time of the corresponding time zone and a coordinated universal time thereof for each time zone; a time zone information acquiring unit for acquiring from the storage unit the time zone information of a time zone of a region where the mobile unit is located and an adjacent time zone to the time zone, based on the current location information acquired by the location information acquiring unit; a determination unit for determining, from the current location information acquired by the location information acquiring unit and the boundary information in the time zone information acquired by the time zone information acquiring unit, whether or not the corresponding mobile unit is located within a set area which is provided in the range of a predetermined distance from the boundary of the time zone to which the current location of the mobile unit belongs; and a display control unit for causing the display unit to display distinctively the time zone to which the current location of the mobile unit belongs and the adjacent time zone which is adjacent to the corresponding time zone through the set area, when it is determined by the determination unit that the mobile unit is located within the set area.

Effect of the Invention

According to the invention, there is an advantageous effect such that a map display in which the change of the time zone is readily visible can be achieved.

BEST MODE FOR CARRYING OUT THE INVENTION

In the following, in order to explain the present invention in more detail, embodiments for carrying out the invention will be described with reference to the accompanying drawings.
Embodiment 1

Figure 1:
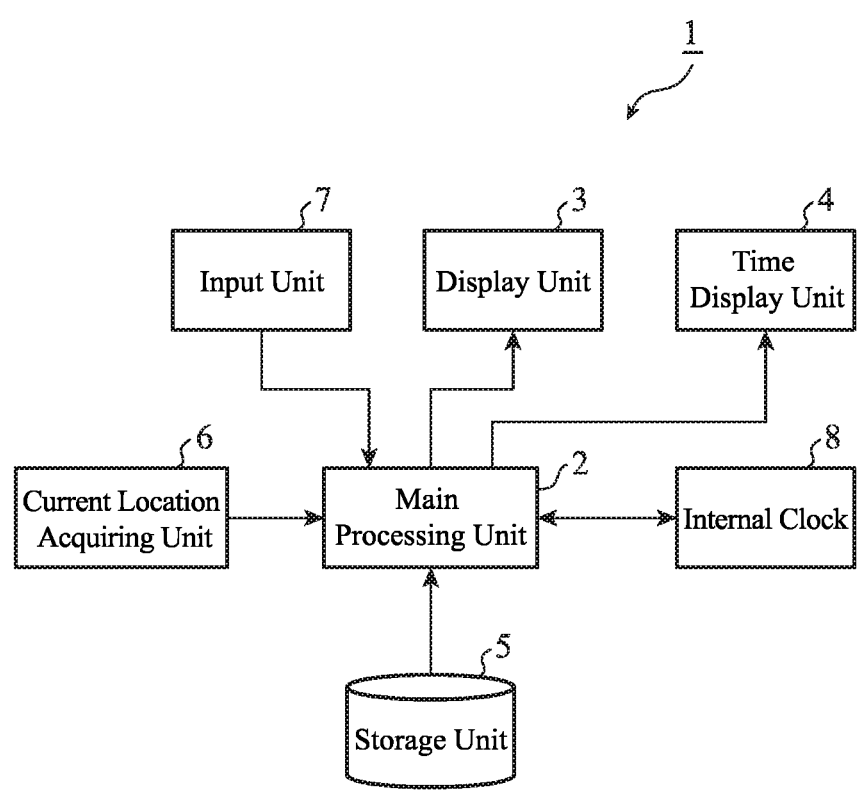
FIG. 1 is a block diagram showing a configuration of a map display device according to Embodiment 1 in the present invention.

FIG. 1 is a block diagram showing a configuration of a map display device according to Embodiment 1 in the present invention. In FIG. 1, a map display device 1 in Embodiment 1 is a device for displaying a map corresponding to a traveling location of a vehicle equipped with the device itself, and includes a main processing unit 2, a display unit 3, a time display unit 4, a storage unit 5, a current location acquiring unit 6, an input unit 7 and an internal clock 8.

The main processing unit 2 is a constitutional unit that controls the constitutional units of the map display device 1 to perform map display processes, and causes the display unit 3 to display distinctively a vehicle-located time zone and an adjacent time zone thereto, when the vehicle comes close to a boundary of the time zone.

The display unit 3 is a display monitor for displaying the map and so on, including an LCD monitor or the like. The time display unit 4 is a display unit for displaying a current time in a vehicle-located region. Also, the time display unit 4 may be a display device provided independently of the display unit 3, or may be a display section in which a time is displayed in a part on the display screen of the display unit 3.

The storage unit 5 is a storage unit for storing a variety of information such as map data and time zone information to be used for a map display. It is noted that the time zone information is information that includes: vertex coordinates of a polygon representing the boundary of the time zone in the map (boundary information); and time difference information representing a time difference between a standard time of the corresponding time zone and a universal time coordinated (UTC) for each time zone.

The current location acquiring unit 6 is a constitutional unit for acquiring current location information of the vehicle from a location detecting unit (not shown) using, for example, a GPS (Global Positioning System) receiver, a vehicle speed sensor, an acceleration sensor, an angular velocity sensor, and so on, and supplies the acquired current location information to the main processing unit 2.

The input unit 7 is a constitutional unit for providing an instruction signal to the main processing unit 2 in accordance with to a user's operation or instruction, and is, for example, an operation switch, a touch panel attached to the display unit 3, a remote control switch, or the like. A predetermined distance from the boundary of the time zone is inputted through the use of the input unit 7. A set area for determining whether or not the vehicle comes close to the boundary of the time zone is defined by the predetermined distance.

The internal clock 8 is a built-in clock provided in a computer serving as the map display device 1, and measures a time (hereinafter, referred to as 'a reference time') in a predetermined time zone (referred to as 'a reference time zone').

Figure 2:
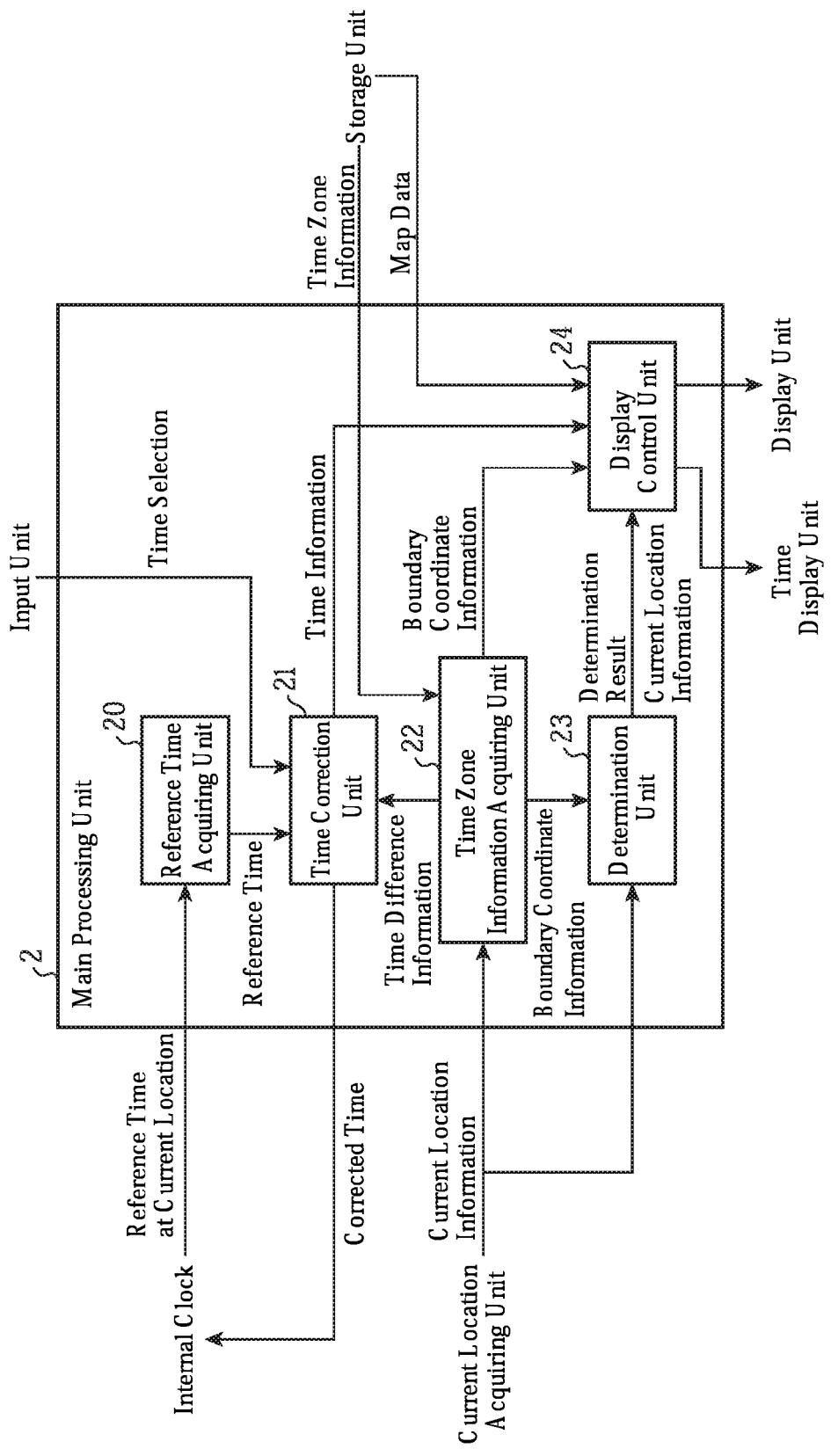
FIG. 2 is a block diagram showing a functional configuration of a main processing unit in FIG. 1.

FIG. 2 is a block diagram showing a functional configuration of a main processing unit in FIG. 1. In FIG. 2, the main processing unit 2 includes a reference time acquiring unit 20, a time correction unit 21, a time zone information acquiring unit 22, a determination unit 23 and a display control unit 24.

The reference time acquiring unit 20 is a constitutional unit for acquiring a reference time from the internal clock 8, and the time correction unit 21 is a constitutional unit for correcting a time at the current location of the vehicle on the basis of the time difference information included in the time zone information and the reference time. The time correction unit 21 corrects the time at the current location of the vehicle by using the reference time in the reference time zone acquired from the internal clock 8 by the reference time acquiring unit 20, and the time difference information to the UTC acquired by the time zone information acquiring unit 22.

The time zone information acquiring unit 22 is a constitutional unit for acquiring from the storage unit 5 the time zone information of a time zone to which the current location belongs and an adjacent time zone thereto by using coordinate information of the current location inputted from the current location acquiring unit 6, and the unit extracts time difference information to the UTC and boundary coordinate information of the time zone from the acquired time zone information.

The determination unit 23 is a constitutional unit for determining whether or not the vehicle is within a set area from the current location information inputted from the current location acquiring unit 6 and the boundary coordinate information of the time zone inputted from the time zone information acquiring unit 22. Here, the set area is an area which is provided in the range of a predetermined distance from the boundary of the time zone to which the current location of the vehicle belongs toward the inside of the zone.

The display control unit 24 is a constitutional unit for controlling display processes in the display unit 3 and the time display unit 4, in particular, corresponding to the determination result by the determination unit 23, performing a display which distinguish a time zone to which a vehicle-located region belongs from a time zone adjacent thereto through the set area.

It is noted that the reference time acquiring unit 20, the time correction unit 21, the time zone information acquiring unit 22, the determination unit 23 and the display control unit 24 are implemented as concrete measures by incorporation of hardware and software, for example, by causing a computer to execute a display processing program according to the subject in the invention. In other words, the functions of the above constitutional units 20 to 24 are specified in program modules in the above display processing program.

Next, an operation thereof will be described.

Figure 3:
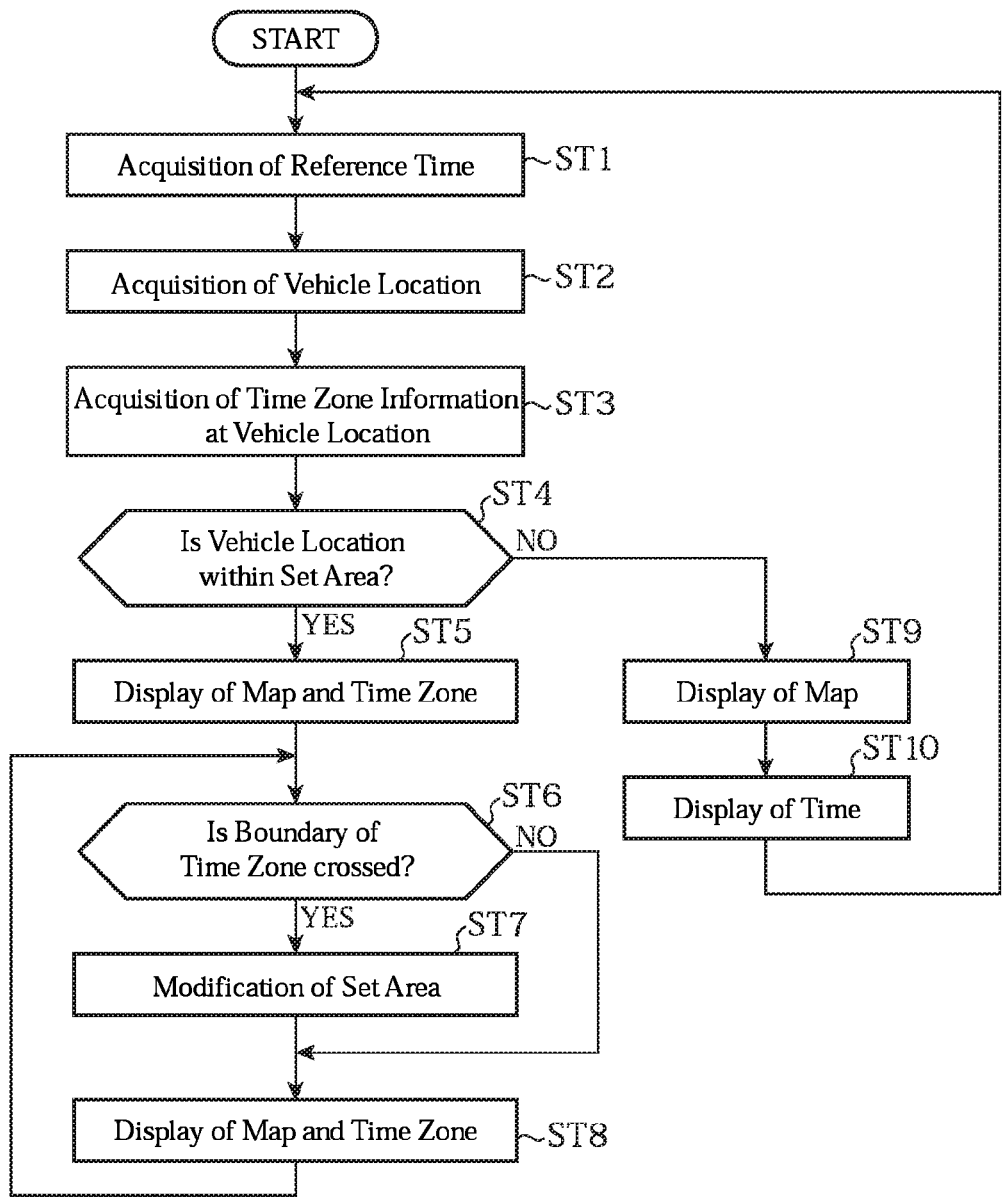
FIG. 3 is a flowchart showing a flow for map display processes according to the map display device of Embodiment 1.

FIG. 3 is a flowchart showing a flow for map display processes by the map display device in Embodiment 1. Referring to FIG. 3, out of the map display processes, in particular, a process for performing a display that distinguish the time zone to which the vehicle-located region belongs from the adjacent time zone thereto will be described.

First, the reference time acquiring unit 20 in the main processing unit 2 acquires a reference time from the internal clock 8 (Step ST1). The reference time is outputted from the reference time acquiring unit 20 to the time correction unit 21. Next, when current location information of the vehicle is acquired by the current location acquiring unit 6, the time zone information acquiring unit 22 and the determination unit 23 acquire the corresponding current location information from the current location acquiring unit 6 (Step ST2).

Using the current location information acquired from the current location acquiring unit 6, the time zone information acquiring unit 22 makes a search for the storage unit 5 to thereby acquire the time zone information of a time zone to which a region including the current vehicle location belongs, and the time zone information of a time zone adjacent to the time zone (Step ST3). In this case, vertex coordinates of a polygon representing a boundary of the time zone in the map (hereinafter, referred to as 'boundary coordinate information,' if appropriate) are read out from the time zone information; the time zone information of the time zone is identified based on whether or not, within a region specified by the coordinates, a coordinate of the current location of the vehicle represented by the current location information is placed; and further the time zone information of the time zone adjacent to the time zone represented by the corresponding time zone information is identified.

Thereafter, from the acquired time zone information, the time zone information acquiring unit 22 extracts boundary coordinate information specifying the time zone to output the resultant to the determination unit 23 and the display control unit 24, and also extracts time difference information indicative of a time difference between a standard time of the corresponding time zone and the UTC to output the resultant to the time correction unit 21. Further, the time correction unit 21 corrects a time at the current location of the vehicle by using the reference time inputted from the reference time acquiring unit 20 and the time difference information acquired by the time zone information acquiring unit 22. Time information indicative of the corrected time is outputted from the time correction unit 21 to the display control unit 24. In this manner, when the time is automatically changed, it is possible to change the time of the time zone with a little burden on a user.

The determination unit 23 determines whether or not the vehicle is within the set area by using the boundary coordinate information of the vehicle-located time zone inputted from the time zone information acquiring unit 22, and the current location information inputted from the current location acquiring unit 6 (Step ST4). At this point, if the vehicle is determined to be within the set area (Step ST4; YES), the determination unit 23 outputs the determination result to the display control unit 24.

When the determination result that the vehicle is within the set area is inputted from the determination unit 23, the display control unit 24 controls the display unit 3 to display the map and time zones in such a manner that the vehicle-located time zone and the time zone adjacent to this through the set area are distinguished from each other.

In this manner, under control of the display control unit 24, the display unit 3 displays the map centering the vehicle location and also displays the vehicle-located time zone and the time zone adjacent thereto to be distinguished from each other (Step ST5).

When the map and time zones are displayed on a screen of the display unit 3 in such a manner that the vehicle-located time zone and the adjacent time zone are distinguished from each other, the determination unit 23 further determines whether or not the boundary of the time zone where the vehicle has been located is crossed by using current location information inputted from the current location acquiring unit 6 and boundary coordinate information inputted from the time zone information acquiring unit 22 (Step ST6).

At this time, if the boundary of the time zone is crossed by the vehicle (Step ST6; YES), the determination unit 23 modifies as a new set area a set area which is provided in the range of a predetermined distance from the boundary of an arrived time zone of the vehicle toward the inside of the zone (Step ST7).

After this, on the assumption that the vehicle is within the modified set area, the determination unit 23 outputs the determination result to the display control unit 24.

Upon inputting from the determination unit 23 the determination result that the vehicle is within the new set area, the display control unit 24 controls the display unit 3 to display the map and time zones in such a manner that a time zone where the vehicle is located and a time zone which is adjacent thereto through the new set area are distinguished from each other. In such a way, under control of the display control unit 24, the display unit 3 displays the map centering the vehicle location and also displays the vehicle-located time zone (arrival time zone of the vehicle) and the adjacent time zone (departure time zone of the vehicle) to be distinguished from each other (Step ST8).

On the other hand, if the boundary of the time zone is not crossed by the vehicle (Step ST6; NO), the determination result is outputted to the display control unit 24, and the displays of the map and time zones in Step ST5 are continued (Step ST8).

Further, if the vehicle is not within the set area (Step ST4; NO), the determination unit 23 outputs the determination result to the display control unit 24.

Upon inputting from the determination unit 23 the determination result that the vehicle is not within the set area, the display control unit 24 controls the display unit 3 to display the map without a distinction between the vehicle-located time zone and the adjacent time zone thereto through the set area. In this manner, under control of the display control unit 24, the display unit 3 displays the map including a vehicle location (map centering the vehicle location) (Step ST9).

In addition, based on the time information inputted from the time correction unit 21, the display control unit 24 controls the time display unit 4 to display a time at the current location of the vehicle. In this manner, under control of the display control unit 24, the time display unit 4 displays a current time at the vehicle location (Step ST10). Thereafter, returning to the process of Step ST1, the above processes are repeated.

Figure 4:
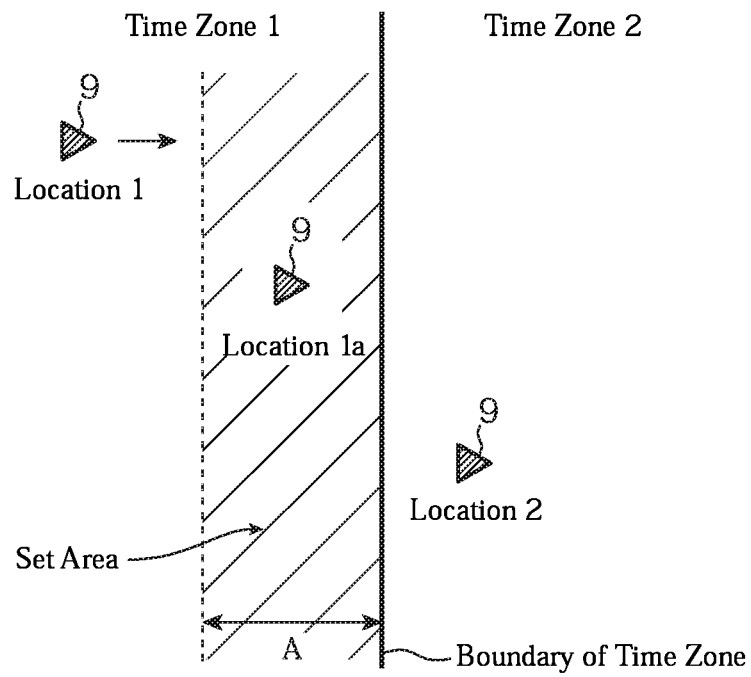
FIG. 4 is a diagram for illustrating determination processes for a vehicle location with respect to a set area.
Figure 4:
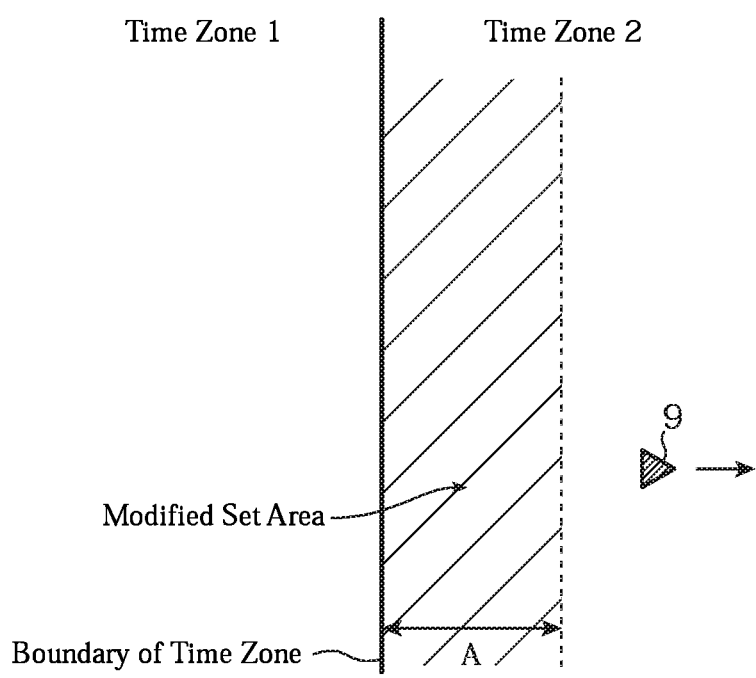

FIG. 4 is a diagram for illustrating determination processes for the vehicle location with respect to the set area:

FIG. 4(a) is a view for illustrating a process for determining whether or not the location is within the set area corresponding to Step ST4 in FIG. 3; and FIG. 4(b) is a view for illustrating a process corresponding to Step ST6 in FIG. 3.

In FIG. 4(a), an area shown by hatching is the set area, and is represented by an area which is provided in the range of a predetermined distance A from the boundary of a time zone 1 at the current location in which the vehicle exists toward the inside of the zone. Also, a time zone 2 is a time zone which is adjacent to the time zone 1 through the above set area. Because a location 1 is out of the set area toward the inside of the time zone 1, if the vehicle 9 is located at the location 1, it is determined in Step ST4 in FIG. 3 that "the vehicle is not within the set area" and a map is displayed in the display unit 3 without a distinction between the time zone 1 and the time zone 2.

On the other hand, if the vehicle 9 is located at the location 1a, it is determined that "the vehicle is within the set area" in Step ST4 in FIG. 3, and that the time zone 1 and the time zone 2 are displayed on the screen of the display unit 3 to be distinguished from each other in step ST5.

If the determination unit 23 determines that the vehicle 9 is within the set area, the determination unit determines immediately whether or not the boundary of the time zone 1 is crossed by the vehicle 9, and the corresponding processes are continuously carried out. Here, if the boundary of the time zone 1 is crossed by the vehicle 9 as shown at a location 2 in FIG. 4(a), the determination unit 23 immediately modifies the set area as shown in FIG. 4(b) by using the arrived time zone 2 of the vehicle 9 as a standard. If the vehicle 9 is within the modified set area, it is displayed such that the departure time zone 1 is distinguished from the arrival time zone 2.

If the vehicle 9 moves further to go out of the set area toward the inside of the time zone 2 as shown at FIG. 4(b), the map is displayed on the display unit 3 without a distinction between the time zone 2 and the time zone 1.

Figure 5:
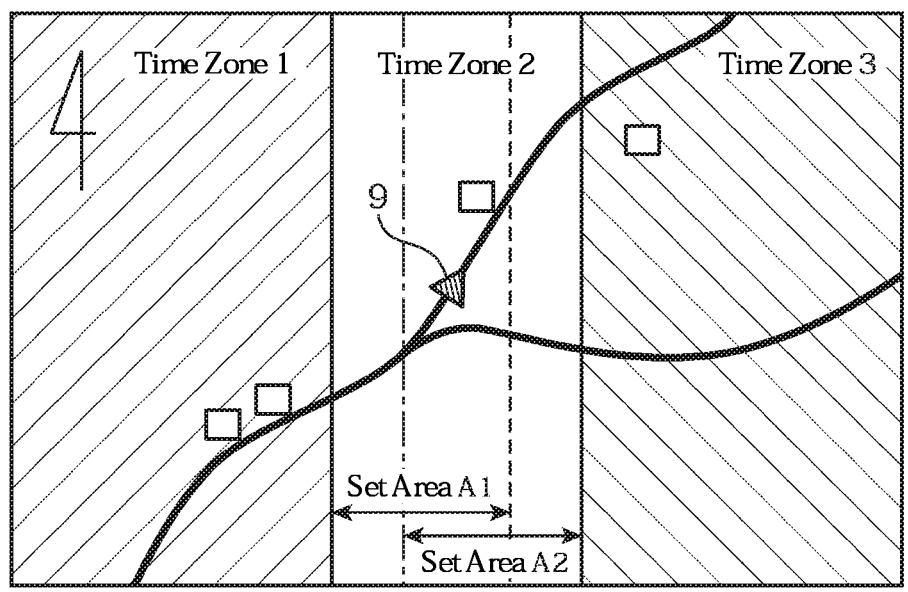
FIG. 5 is a diagram showing one example of a display in which a vehicle-located time zone and an adjacent time zone thereto are distinguished from each other.

FIG. 5 is a diagram showing one example of a display in which a vehicle-located time zone and a time zone adjacent thereto are distinguished from each other, showing a specific example of the display process in Step ST5 in FIG. 3. In the example shown in FIG. 5, the time zone 2 to which a located region of the vehicle 9 belongs is used as a standard, and the color of the zone 2 is not changed, and the time zones 1 and 3 adjacent to the time zone 2 are displayed in different colors.

The vehicle 9 is located in both ranges of the set area A1 on the time zone 1 side and the set area A2 on the time zone 3 side; thus, the display processing unit 24 depicts background images of regions to which the time zones 1 and 3 belong so that the time zones 1 and 3 have background colors different to each other, and depicts by using map data in the storage unit 5 the map of the region including the location of the vehicle 9 as superimposed over the above background images to thereby display the resultant on the screen of the display unit 3. It is noted that in FIG. 5 the boundary line between the time zones is illustrated by a solid line; however, in fact, the background images in different colors representing the time zones 1 and 3 are only displayed, and the boundary line is not explicitly displayed.

As mentioned above, the display of the time zones in different colors can perform a map display in which the change of the time zone is readily visible.

In addition, when only the adjacent time zones 1 and 3 are displayed in different colors from each other without a change in color of the time zone 2 to which the located region of the vehicle 9 belongs, it is possible to show clearly the adjacent time zones 1 and 3 without imposing an uncomfortable feeling such that a located map region of the vehicle 9 is suddenly changed in color.

Figure 6:
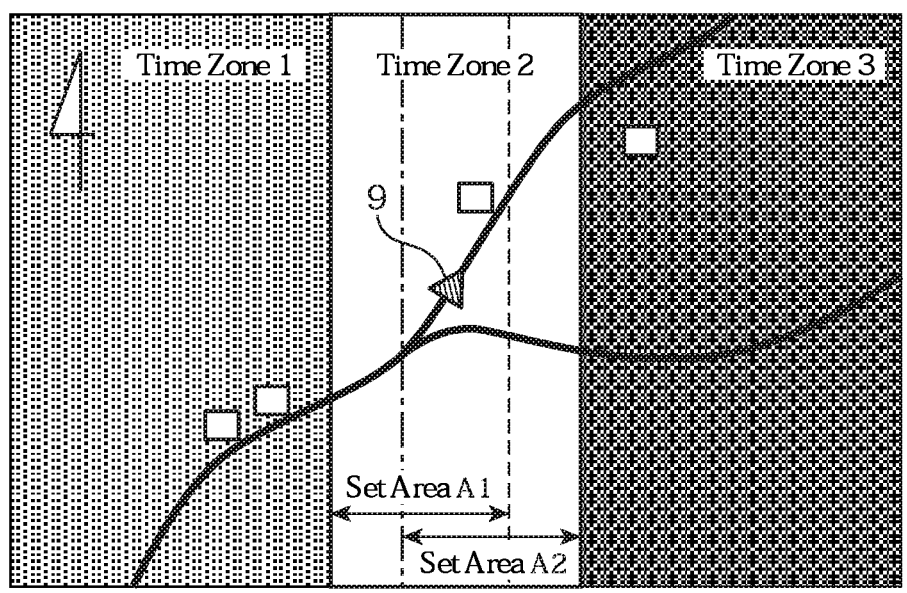
FIG. 6 is a diagram showing another example of a display in which a vehicle-located time zone and an adjacent time zone thereto are distinguished from each other.

FIG. 6 is a diagram showing another example of a display in which a vehicle-located time zone and adjacent time zones thereto are distinguished from each other. In FIG. 6, as the time zones are displayed in different colors as in FIG. 5, a specific example of color tones in different colors is shown.

First, the time zone information acquiring unit 22 determines respective time differences of the time zones 1 and 3 relative to the time zone 2, and outputs the information of the time differences to the display control unit 24.

If the time difference of the adjacent time zone is gained as compared with that of the located time zone of the vehicle 9, the display control unit 24 draws the background image of the region to which the corresponding adjacent time zone belongs with warm colors, whereas if the time difference of the adjacent time zone is lost as compared with that of the located time zone of the vehicle 9, it draws the background image of the region to which the adjacent time zone belongs with cold colors.

In the example of FIG. 6, since the time difference of the time zone 1 is gained as compared with that of the located time zone 2 of the vehicle 9, the time zone 1 is displayed in warm colors, and since the time difference of the time zone 3 is lost as compared with that of the located time zone 2 of the vehicle 9, the time zone 3 is displayed in cold colors.

Meanwhile, in accordance with the gained state or lost state of the time difference, it may be contemplated that a deepness and/or a kind of warm colors or cold colors thereof are selectable. It is noted that also in FIG. 6 the boundary line between the time zones is illustrated by a solid line, as in FIG. 5; in fact, the background images in different colors representing the time zones 1 and 3 are only displayed, and the boundary line is not explicitly displayed.

With such a displaying manner, from the color tone of the time zone, in addition to the change of the time zone, the gained or lost time difference to the current location is readily visible.

Figure 7:
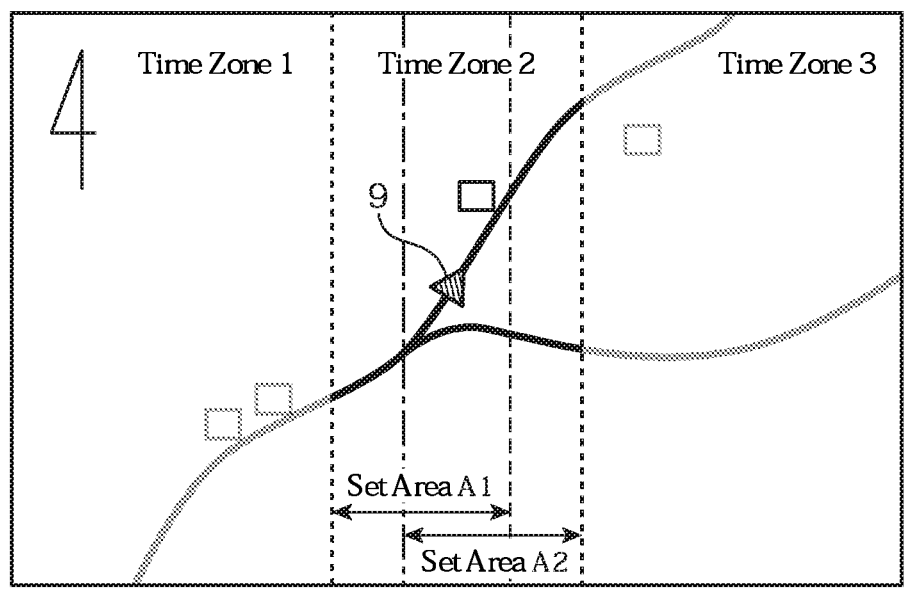
FIG. 7 is a diagram showing still another example of a display in which a vehicle-located time zone and an adjacent time zone thereto are distinguished from each other.

FIG. 7 is a diagram showing still another display example in which a vehicle-located time zone and adjacent time zones thereto are distinguished from each other. In FIG. 5 and FIG. 6, illustrated is the instance where the time zone is represented as the background image over which the map image is superimposed, whereas in an example shown in FIG. 7, with reference to a located time zone 2 of a vehicle 9, time zones 1 and 3 adjacent thereto are depicted as semitransparent area images, and the corresponding semitransparent images of the time zones are superimposed on the map image including the location of the vehicle 9 to be displayed.

Such a displaying manner can also perform a map display in which the change of the time zone is readily visible.

As described above, according to Embodiment 1, the map display device includes: the location information acquiring unit 6 for acquiring the current location information of the vehicle 9; the storage unit 5 for storing the boundary information representing the region belonging to the time zone, and the time zone information having the time difference between the standard time of the corresponding time zone and the coordinated universal time thereof for each time zone; the time zone information acquiring unit 22 for acquiring from the storage unit 5 the time zone information of the time zone of the region where the vehicle 9 is located and the time zone adjacent thereto, based on the current location information acquired by the location information acquiring unit 6; the determination unit 23 for determining, from the current location information acquired by the location information acquiring unit 6 and the boundary coordinate information in the time zone information acquired by the time zone information acquiring unit 22, whether or not the vehicle 9 is located within the set area which is provided in the range of a predetermined distance from the boundary of the time zone to which the current location of the vehicle 9 belongs; and a display control unit 24 for causing the display unit 3 to display the time zone to which the current location of the vehicle 9 belongs and the adjacent time zone which is adjacent to the corresponding time zone through the set area thereof with distinguishing the time zone and the adjacent time zone, when it is determined by the determination unit 23 that the vehicle 9 is located within the set area. Such a configuration can perform a map display in which the change of the time zone is readily visible.

It is noted that though in the above Embodiment 1, illustrated is the instance where the set area is specified by a fixedly defined distance A, the set area may be changed according to a scale of a map to be displayed.

For example, the distance A is predetermined for each scale of maps, and the set area is specified by the distance A according to the scale of the map to be displayed.

Embodiment 2

In the above Embodiment 1, the instance where the vehicle-located time zone and adjacent time zones thereto are displayed to be distinguished from each other is described; however, in Embodiment 2, in addition to this, an instance where the time difference with reference to the vehicle-located time zone or the list of times at the time zones is displayed is described. Also, although a basic configuration of the map display device in Embodiment 2 is the same as that of FIG. 1 and FIG. 2 shown in the above Embodiment 1, it is different in that the aforementioned time difference or the list of times at the time zones is displayed. Accordingly, the components of the device will be referred to those of FIG. 1 and FIG. 2.

Next, an operation thereof will be described.

Figure 8:
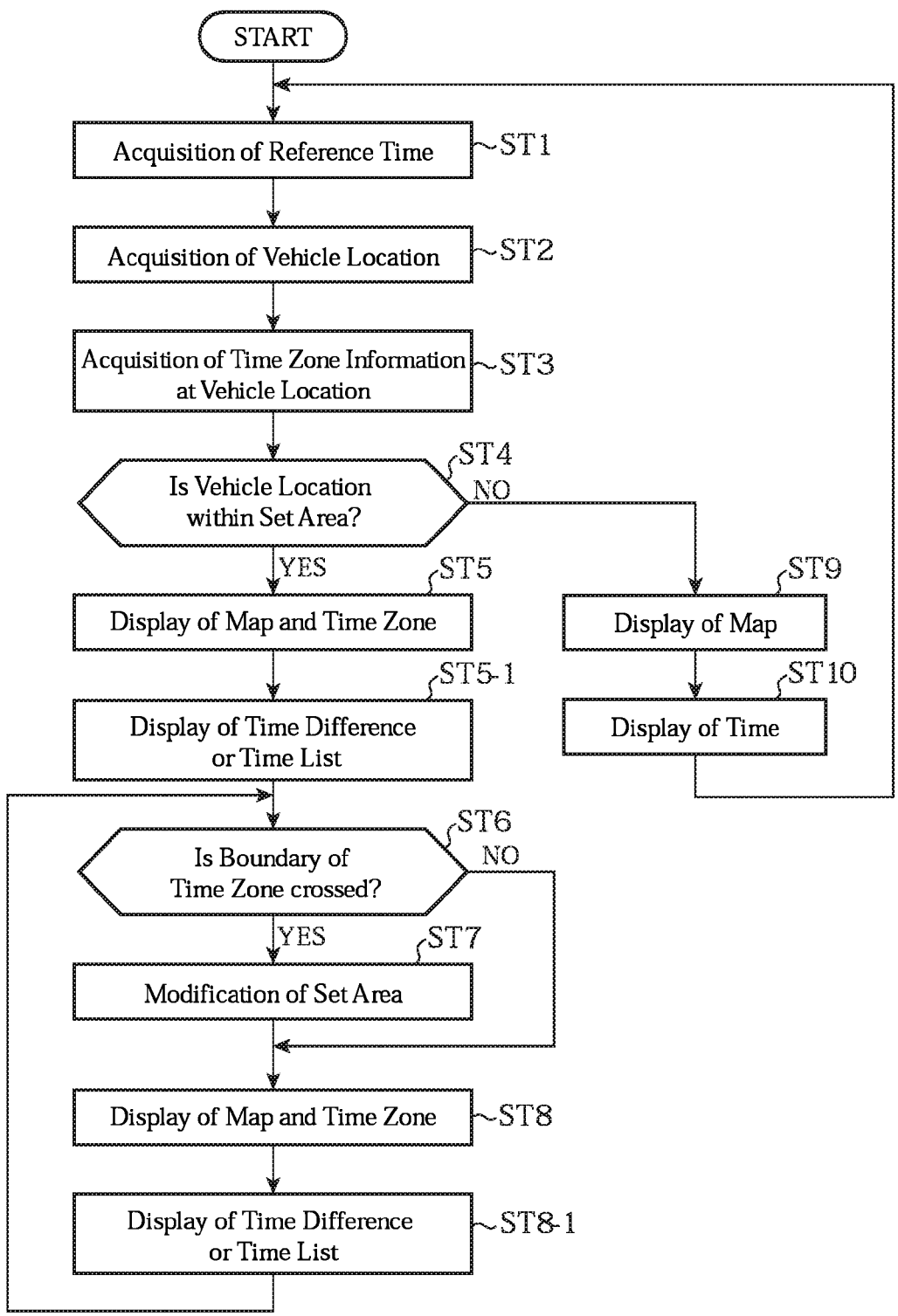
FIG. 8 is a flowchart showing a flow for map display processes according to a map display device of Embodiment 2 in the invention.

FIG. 8 is a flowchart showing a flow of map display processes according to the map display device of Embodiment 2 in the present invention. In FIG. 8, it is different from the processes in FIG. 3 shown in the above Embodiment 1 in that Step ST5-1 for displaying the time difference or time list and Step ST8-1 are included therein. Accordingly, descriptions of the processes other than Step ST5-1 and Step ST8 will be omitted herein.

First, a time zone information acquiring unit 22 acquires, in addition to a vehicle-located time zone, time zone information of a time zone adjacent thereto through a set area, determines a time difference relative to the vehicle-located time zone and outputs information of the time difference to a display control unit 24.

In Step ST5-1 and Step ST8-1, the display control unit 24 draws on the image of the adjacent time zone the time difference relative to a current time of the vehicle-located time zone.

Figure 9:
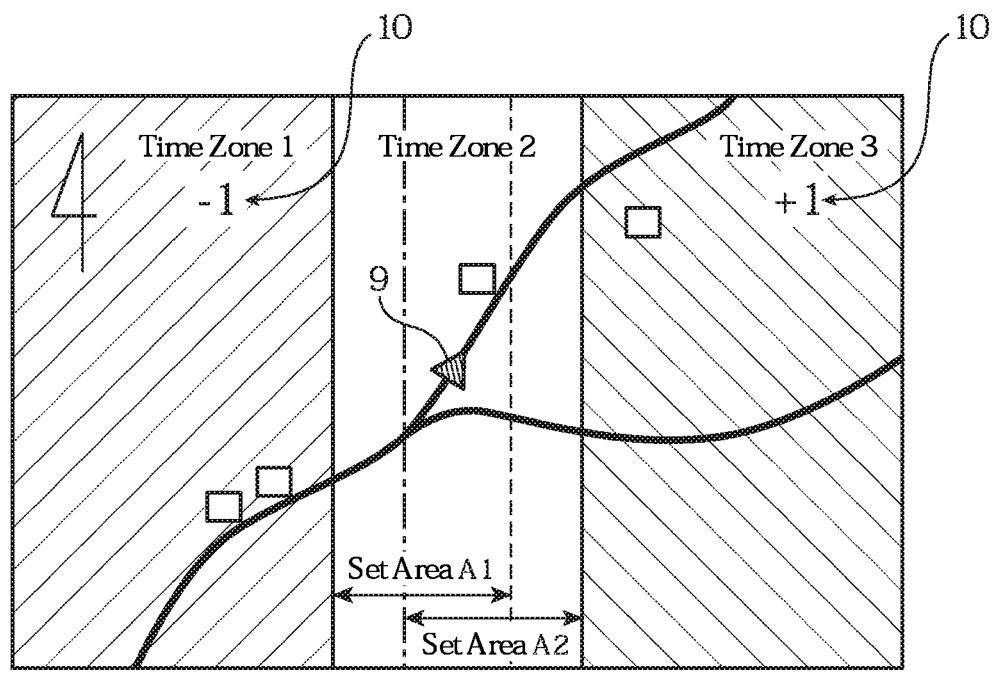
FIG. 9 is a diagram showing a display example of time differences in a vehicle-located time zone and an adjacent time zone thereto.

FIG. 9 is a diagram showing one example of a time difference display in a vehicle-located time zone and a time zone adjacent thereto. In the example shown in FIG. 9, the vehicle 9 is located within both of set areas A1 and A2, and therefore the display control unit 24 draws the time zones as background images so that the time zones 1 to 3 have respective background colors different from one another, and further draws the time differences relative to a current time of the time zone 2 in time difference display sections 10 on the images of the adjacent time zones 1 and 3 to be displayed on the display unit 3. In this example, the time zone 1 gains one hour relative to the current time of the time zone 2, and the time zone 3 loses one hour relative to the current time of the time zone 2.

It is noted that in FIG. 9 a boundary line between the time zones is illustrated by a solid line; however, in fact, the boundary line of the time zones 1 and 3 is not explicitly displayed.

With such a displaying manner, a time difference between the current time of the vehicle and the time zone adjacent thereto is intuitively visible from the colors.

Instead, in Step ST5-1 and Step ST8-1, the display control unit 24 may depict the current time at the vehicle-located time zone and the current time at the adjacent time zone in a list form to be displayed on the display unit 3.

In this case, with a difference between a time difference DT of the adjacent time zone and a time difference DTs at the vehicle-located time zone acquired in Step ST3, a time T corrected from the reference time Ts that is acquired in Step ST1 is calculated according to the following equation (1), and the calculated time T is displayed in a list form as superimposed over a map displayed in Step ST5 or Step ST-8. However, in the following equation (1), the losing and gaining of the time difference are provided with negative and positive signs, respectively.

$$T = Ts + (DT - DTs) \quad (1)$$

Figure 10:
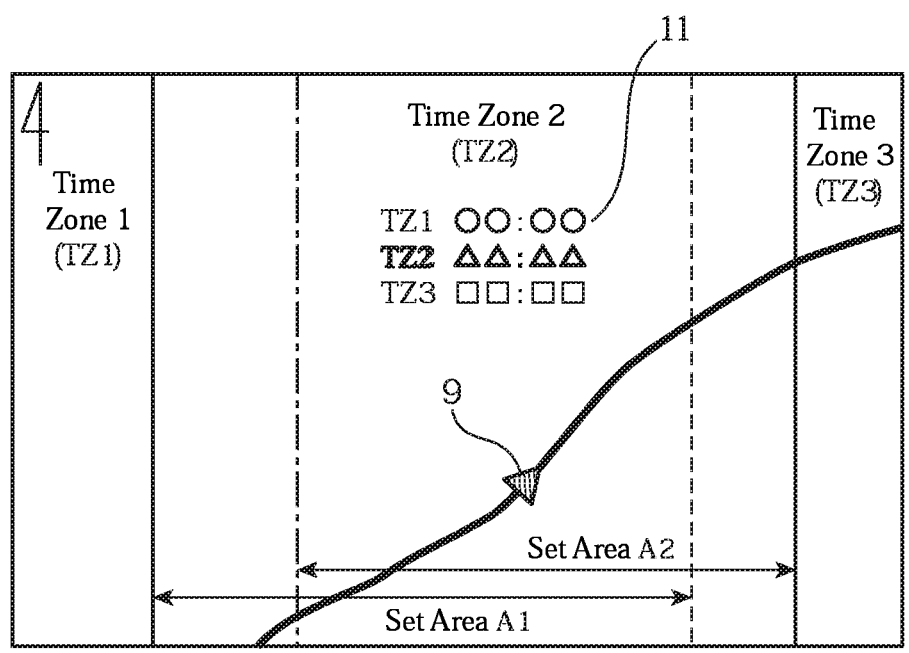
FIG. 10 is a diagram showing a list display example of times in a vehicle-located time zone and an adjacent time zone thereto.

FIG. 10 is a diagram showing one example of a list display of times in a vehicle-located time zone and a time zone adjacent thereto. In this instance, the time zone information acquiring unit 22 acquires, in addition to a vehicle-located time zone, time zone information of the time zone adjacent thereto through a set area, determines time differences relative to the vehicle-located time zone and outputs information of the time differences to the time correction unit 21.

The time correction unit 21 determines current times in the time zones 1 to 3, respectively, based on the reference time inputted from the reference time acquiring unit 20 and the time difference information of the time zones 1 to 3 inputted from the time zone information acquiring unit 22, and then outputs information of these times to the display control unit 24.

The display control unit 24 represents in a list form the information of the times in the time zones 1 to 3 inputted from the time correction unit 21, and depicts the resultant in a time list display section 11 in the time zone 2 where the vehicle 9 is located, to be displayed on the display unit 3. The thus displayed time list can perform a map display to be readily visible for the current time of the vehicle and the current times in the adjacent time zones.

It is noted that the time in the time zone 2 where the vehicle 9 is located may be displayed as highlighted relative to the times in the other time zones 1 and 3. In the example of FIG. 10, the time in the time zone 2 is indicated by boldface. For a highlighting method, methods such as color difference, gray scale difference, and blinking, in addition to the boldface display, can be employed. Another method may be employed, so far as the time in the time zone 2 where the vehicle 9 is located is displayed as highlighted.

Further, the current time in the current time zone may be corrected manually in a manner that a user refers to the time list displayed on the display unit 3 and then selects the current time in the list by the input unit 7. Namely, when the vehicle 9 cross over the boundary of the time zone, the current time at the arrival time zone is selected out of the list and the display of the current time is corrected. In this manner, when the time change of the time zone is performed by a simple operation referring to the time list, it is possible for the user to change the time in the time zone with a little burden.

As described above, according to Embodiment 2, based on the time difference information included in the time zone information, the display control unit 24 displays the time differences relative to the time zone 2 to which the current location of the vehicle 9 belongs on the adjacent time zones 1 and 3, or displays in a list form the current time in the time zone 2 where the location of the vehicle 9 belongs and the current times in the adjacent time zones 1 and 3.

This makes it possible to achieve a map display that is readily visible for the time difference of the adjacent time zone relative to the current time of the vehicle, or the current time of the adjacent time zone.

Meanwhile, in the above Embodiment 2, time zone information that takes account of a time difference in summer time (DST) may be registered in advance in the storage unit 5. In this case, if the present date and hour is in summer time, the time zone information acquiring unit 22 reads out the time zone information in summer time from the storage unit 5, and the time correction unit 21 makes a time correction taking account of a time difference in summer time.

Embodiment 3

Figure 11:
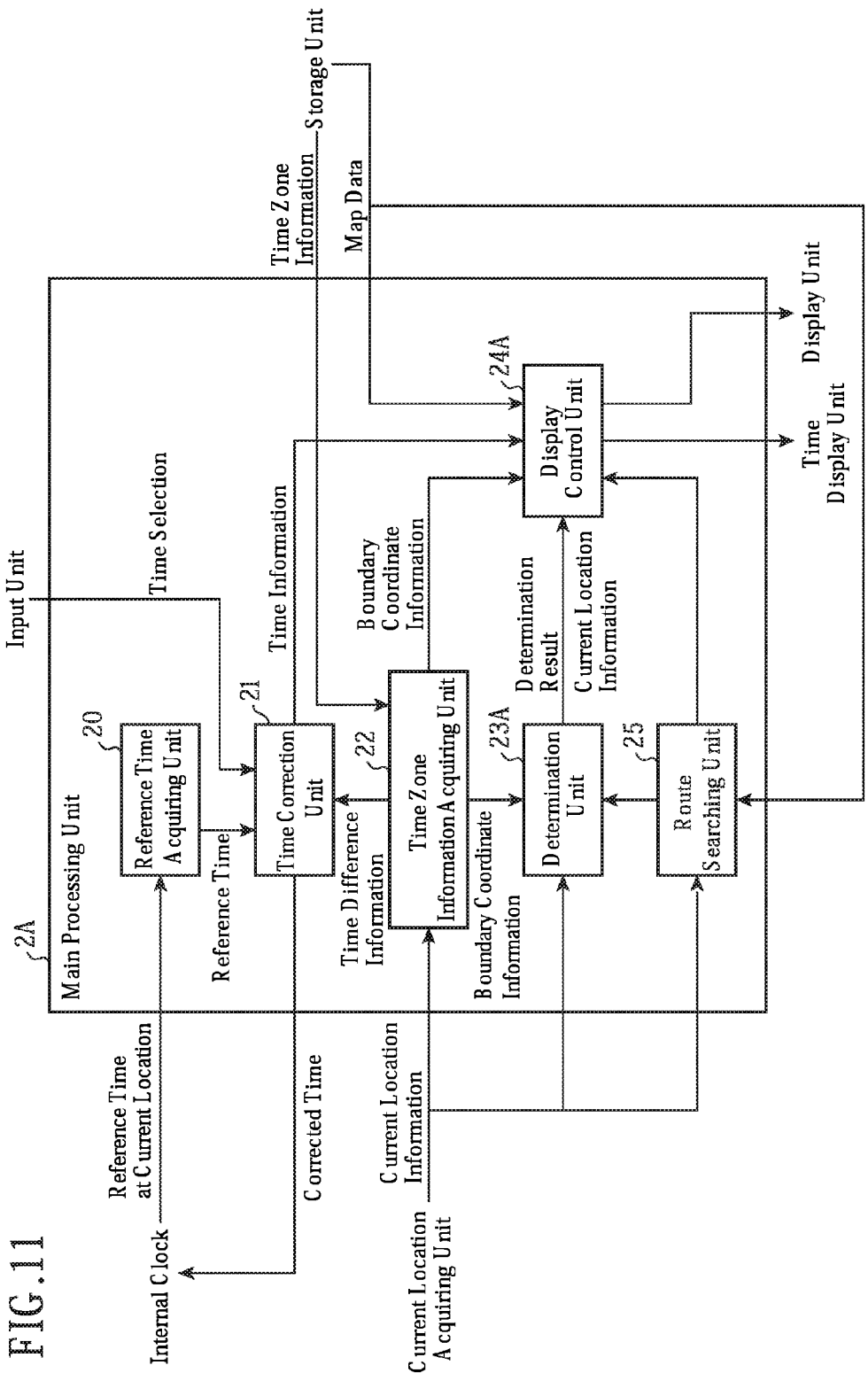
FIG. 11 is a block diagram showing a configuration of a map display device according to Embodiment 3 in the invention.

FIG. 11 is a block diagram showing a functional configuration of a main processing unit in a map display device according to Embodiment 3 in the invention. In FIG. 11, out of the components shown in the above Embodiment 1 with respect to FIG. 2, a main processing unit 2A of Embodiment 3 includes a determination unit 23A and a display control unit 24A that carry out a process specific to Embodiment 3, instead of the determination unit 23 and the display control unit 24, and further includes a route searching unit 25 that searches a route by which a vehicle is guided.

As in Embodiment 1, the determination unit 23A is a constitutional unit that determines whether or not the vehicle is within a set area from current location information inputted from a current location acquiring unit 6 and boundary coordinate information of a time zone inputted from a time zone information acquiring unit 22, and also determines the time zone of a region that a guide route searched by the route searching unit 25 crosses over among regions belonging to a time zone adjacent to a vehicle-located time zone.

The display control unit 24A is a constitutional unit for displaying a vehicle-located time zone and an adjacent time zone thereto through a set area to be distinguished from each other in accordance with a determination result of the determination unit 23A, and in particular, performs a distinctive display for only the region of the time zone that the guide route crosses over, without performing a distinctive display for the time zone of a region that no guide route crosses over.

The route searching unit 25 is a constitutional unit that searches a guide route for the vehicle by using location information of the vehicle acquired by the current location acquiring unit 6 and map data stored in the storage unit 5.

Figure 12:
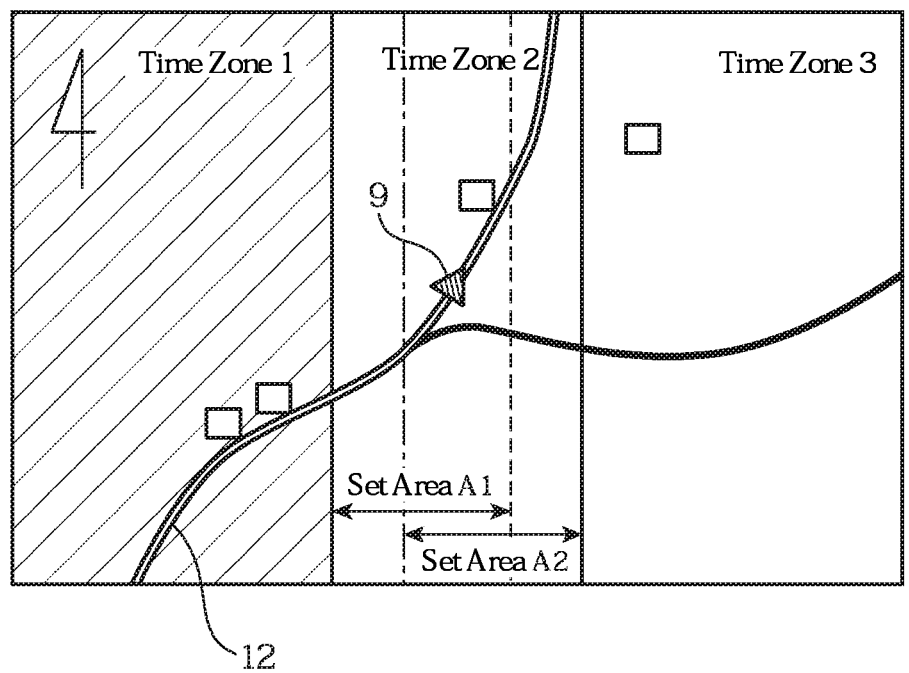
FIG. 12 is a diagram showing one example of a display in Embodiment 3 in which a vehicle-located time zone and an adjacent time zone thereto are distinguished from each other.

FIG. 12 is a diagram showing one example of a display in Embodiment 3 in which a vehicle-located time zone and an adjacent time zone thereto are distinguished from each other. In Embodiment 3, when the guide route is searched by the route searching unit 25, the determination unit 23A determines whether or not the guide route crosses over a region that belongs to the adjacent time zone from coordinate information of the guide route and the boundary coordinate information inputted from the time zone information acquiring unit 22.

For example, as shown in FIG. 12, the time zone 1 determined crossed over by the guide route 12 is displayed distinctively from the time zone 2 where the vehicle 9 is located, because the vehicle 9 is located in a set area A1. In this case, the time zone 1 is displayed as a background image in different color from that of the time zone 2.

On the other hand, the time zone 3 determined not crossed over by the guide route 12 is not subjected to displaying distinctively relative to the time zone 2 even when the vehicle 9 is located in a set area A2. In this manner, when only the time zone in the region where a travel of the vehicle 9 is scheduled is displayed distinctively, the time zone in the area where the travel of the vehicle 9 is scheduled is specialized, which makes more readily visible for a change between these time zones.

It is noted that in FIG. 12 a boundary line between the time zones is illustrated by a solid line; however, in fact, the boundary lines from the time zones 1 and 3 are not explicitly displayed.

In addition, in FIG. 12, illustrated is a case where the time zone 1 determined crossed over by the guide route 12 is displayed distinctively by the color change; however, a display in warm colors or cold colors or a semi-transparent area image as illustrated in Embodiment 1 may also be used.

Furthermore, although illustrated is the case where the main processing unit 2A of Embodiment 3 includes the route searching unit 25, a guide route acquiring unit that acquires guide route information from an external navigation apparatus may be provided instead of the route searching unit 25, such that the determination unit 23A makes a determination by using the guide route information acquired by the guide route acquiring unit.

As described above, according to Embodiment 3, the determination unit 23A determines, based on the boundary coordinate information in the time zone information, whether or not the guide route for the vehicle 9 is included in the region belonging to the adjacent time zone, and the display control unit 24A displays only the adjacent time zone in which it is determined by the determination unit 23A that the guide route for the vehicle 9 is included, distinctively from the time zone 2 to which the current location of the vehicle 9 belongs. This configuration can achieve a map display that is more readily visible for the change of the time zone in the area where the travel of the vehicle 9 is scheduled.

Meanwhile, when a navigation device equipped with the map display devices from the above Embodiment 1 to the above Embodiment 3 is constructed, the time zone change due to a movement of the vehicle 9 along the guide route, and/or the time difference or the time thereof is readily visible.

Further, in the above Embodiment 1 to the above Embodiment 3, although illustrated are the cases where the map display device according to the invention is applied to the on-vehicle information device, it may be applied not only to the on-vehicle navigation device, but also to a map display device in a mobile phone terminal or a handheld terminal (PDA: personal Digital Assistance). Also, it may be applied to a display device such as a PND (Portable Navigation Device) to be used as carried on and carried by a person in a mobile unit such as a vehicle, a train, a ship, an airplane or the like, It is noted that according to the present invention, within the scope of the invention, the embodiments can be freely combined, or any components in the embodiments can be modified or any components in the embodiments can be omitted.

Industrial Applicability

The map display device according to the invention achieves the map display in which the change of the time zone is readily visible even when the vehicle comes and goes between the time zones or when the vehicle travels the road crossing over the boundary between the time zones, and therefore it is suitable for use in the navigation system to be installed in the mobile unit such as vehicle.

EXPLANATION OF REFERENCE NUMERALS

1: map display device, 2, 2A: main processing unit, 3: display unit, 4: time display unit, 5: storage unit, 6: current location acquiring unit, 7: input unit, 8: internal clock, 9: vehicle, 10: time difference display section, 11: time list display section, 20: reference time acquiring unit, 21: time correction unit, 22: time zone information acquiring unit, 23, 23A: determination unit, 24, 24A: display control unit, 25: route searching unit.

The invention claimed is:

1. A map display device, installed in or carried by a mobile entity, for displaying a map on a display device, comprising:
a location information acquiring device for acquiring current location information of the mobile entity;
a storage device that stores time zone information including boundary information representing a region belonging to a time zone, and time difference information between a standard time of the corresponding time zone and a coordinated universal time thereof for each time zone;
a processor;
the processor being configured to perform a time zone information acquiring unit for acquiring from the storage device the time zone information of a time zone of a region where the mobile entity is located and an adjacent time zone to the time zone, based on the current location information acquired by the location information acquiring device;
the processor being further configured to perform a determination unit for determining, from the current location information acquired by the location information acquiring device and the boundary information in the time zone information acquired by the time zone information acquiring unit, whether or not the corresponding mobile entity is located within a set area which is provided in the range of a predetermined distance from the boundary of the time zone to which the current location of the mobile entity belongs before proceeding to an adjacent time zone; and the processor being further configured to perform a display control unit for causing the display device to display distinctively a time zone to which the current location of the mobile entity belongs and an adjacent time zone which is adjacent to the corresponding time zone through the set area, when it is determined by the determination unit that the mobile entity is located within the set area.

2. The map display device according to claim 1, wherein the display control unit causes the display device to display the time zone to which the current location of the mobile entity belongs and the adjacent time zone to the corresponding time zone with colors different from each other.

3. The map display device according to claim 2, wherein the display control unit causes the display device to display the adjacent time zones with colors different from each other, without changing the color of the time zone to which the current location of the mobile entity belongs.

4. The map display device according to claim 2, wherein the display control unit causes the display device to display the adjacent time zone with a color tone which is provided corresponding to a time difference from the time zone to which the current location of the mobile entity belongs.

5. The map display device according to claim 1, wherein the display control unit causes the display device to display the adjacent time zone as a semitransparent area.

6. The map display device according to claim 1, wherein the display control unit causes the display device to display in the adjacent time zone a time difference thereof from the time zone to which the current location of the mobile entity belongs, based on time difference information included in the time zone information.

7. The map display device according to claim 1, wherein the display control unit causes the display device to display in a list form current times in the time zone to which the current location of the mobile entity belongs and in the adjacent time zone, based on time difference information included in the time zone information.

8. The map display device according to claim 1, the processor being further configured to perform a time correction unit for correcting a current time in the time zone to which the current location of the mobile entity belongs, based on the time zone information acquired by the time zone information acquiring unit and a time measured by an internal clock of the map display device.

9. A navigation device which includes the map display device as set forth in claim 1.

10. The navigation device according to claim 9, wherein the determination unit determines, based on the boundary information in the time zone information, whether or not a guide route for the mobile entity is included in an area belonging to the adjacent time zone, and the display control unit causes the display device to display only the adjacent time zone in which it is determined by the determination unit that the guide route for the mobile entity is included, distinctively from the time zone to which the current location of the mobile entity belongs.

* * * * *